United States Patent [19]

Becker

[11] 4,335,488
[45] Jun. 22, 1982

[54] DEVICE FOR FILLING A SHIRRED TUBULAR CASING

[75] Inventor: Reinhold Becker, Wiesbaden, Fed. Rep. of Germany

[73] Assignee: Hoechst Aktiengesellschaft, Frankfurt am Main, Fed. Rep. of Germany

[21] Appl. No.: 180,997

[22] Filed: Aug. 25, 1980

[51] Int. Cl.³ .............................................. A22C 13/00
[52] U.S. Cl. ......................................... 17/33; 17/42; 17/49; 138/118.1; 138/103; 426/106; 426/135
[58] Field of Search ................... 17/49, 35, 41, 42, 33; 138/118.1, 103; 426/135, 105

[56] References Cited

U.S. PATENT DOCUMENTS

| | | |
|---|---|---|
| 1,518,511 | 12/1924 | Henderson . |
| 2,871,508 | 2/1959 | Hill .......................................... 17/41 |
| 3,264,679 | 8/1966 | Moekle ...................................... 17/33 |
| 3,457,588 | 7/1969 | Myles et al. ............................... 17/41 |
| 3,553,769 | 1/1971 | Myles et al. ............................... 17/49 |
| 3,621,513 | 11/1971 | Kupcikevicius .......................... 17/41 |
| 3,808,638 | 5/1974 | Kupcikevicius .......................... 17/35 |
| 3,864,494 | 2/1975 | Kupcikevicius ................. 426/105 X |
| 3,949,446 | 4/1976 | Smith ....................................... 17/41 |
| 3,975,795 | 8/1976 | Kupcikevicius ......................... 17/41 |
| 4,007,761 | 2/1977 | Beckman ............................... 138/103 |
| 4,013,099 | 3/1977 | Gerigk et al. ................. 138/118.1 X |
| 4,017,941 | 4/1977 | Raudys et al. ............................ 17/41 |
| 4,028,775 | 6/1977 | Tysver ..................................... 17/49 |
| 4,034,441 | 7/1977 | Kupcikevicius et al. ............... 17/41 |
| 4,044,426 | 8/1977 | Kupcikevicius et al. ............... 17/49 |
| 4,077,090 | 3/1978 | Frey et al. ............................... 17/41 |
| 4,160,305 | 7/1979 | Tysver ..................................... 17/49 |
| 4,164,057 | 8/1979 | Frey et al. ............................... 17/49 |
| 4,202,075 | 5/1980 | Michel et al. ............................ 17/41 |

FOREIGN PATENT DOCUMENTS 1575351 9/1980 United Kingdom .

Primary Examiner—Willie G. Abercrombie
Attorney, Agent, or Firm—Schwartz, Jeffery, Schwaab, Mack, Blumenthal & Koch

[57] ABSTRACT

A device for controlling the diameter of tubular casing during filling thereof, the device consisting of an annular tapered hollow body having an external diameter smaller than the internal diameter of the deshirred tubular casing whereby during filling and deshirring of the casing, the casing is not expanded beyond its original diameter. The device consists of a hollow body of generally annular configuration, the hollow body having a central opening to receive a stuffing tube and resilient web-like elements on the internal diameter about the opening to engage the tube.

16 Claims, 13 Drawing Figures

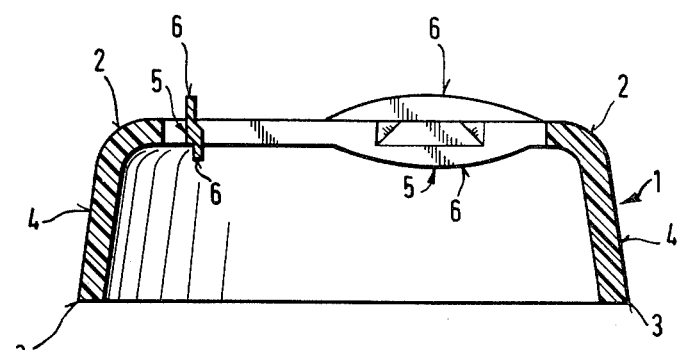
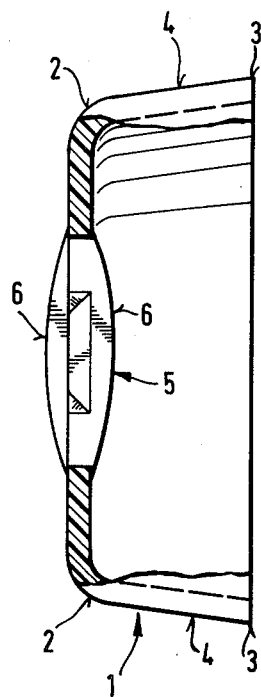
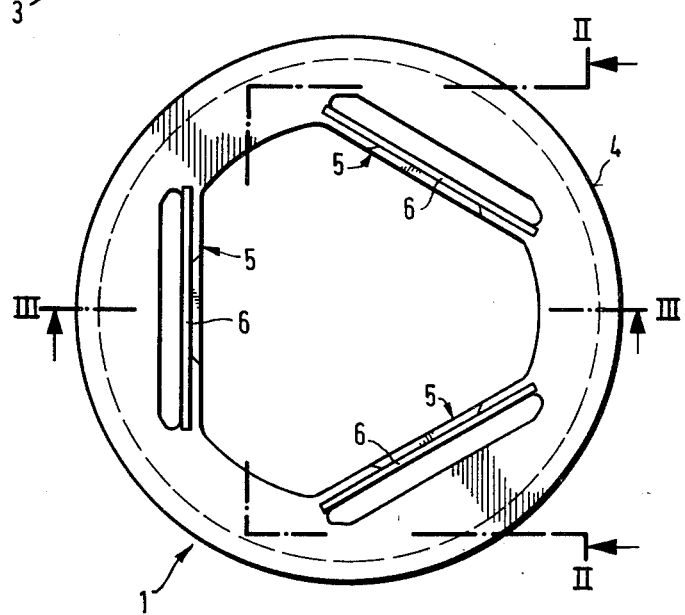

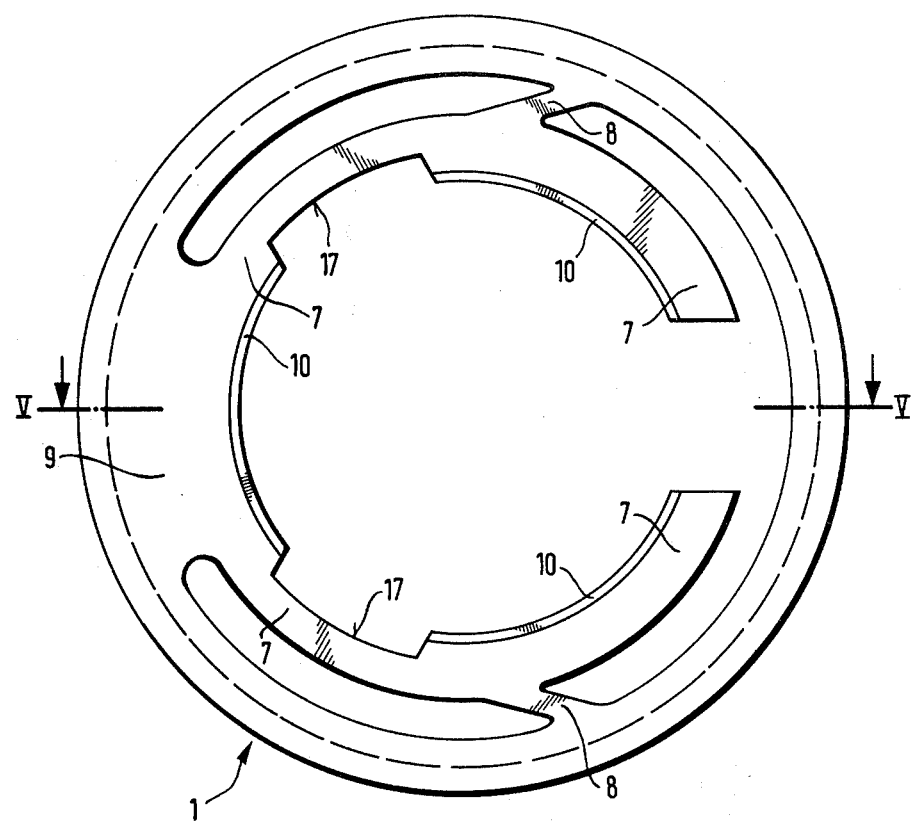
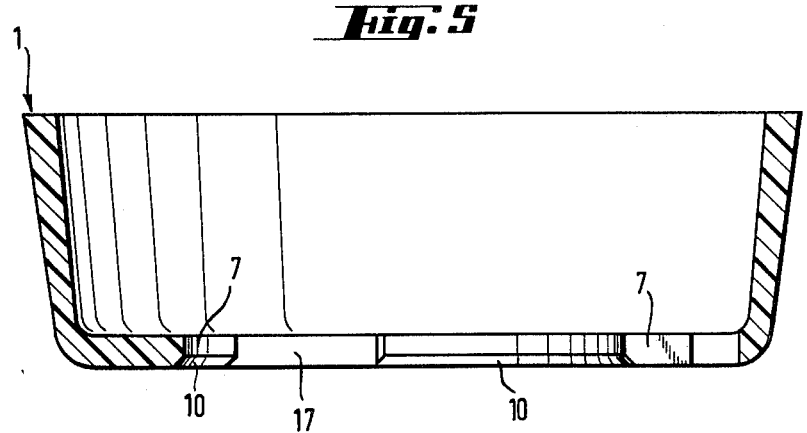

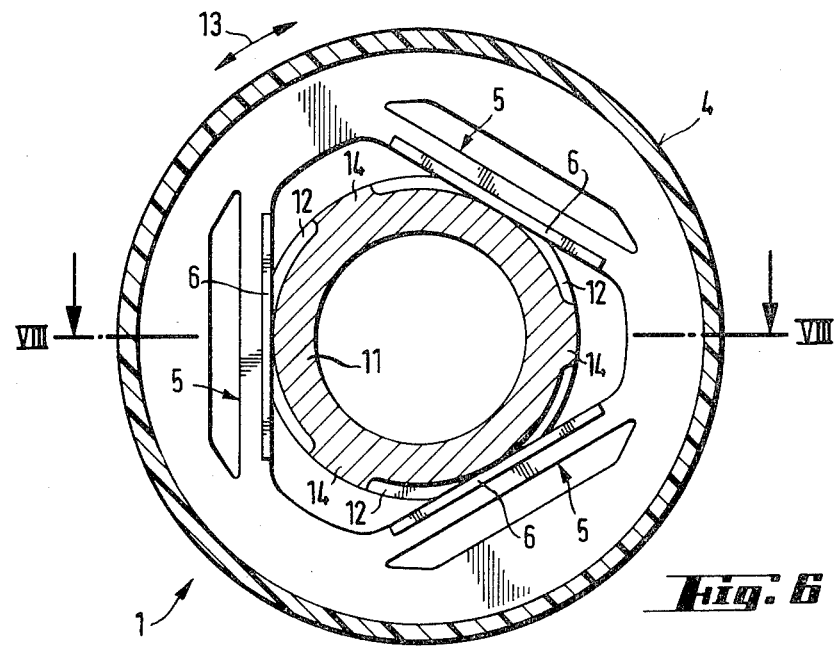
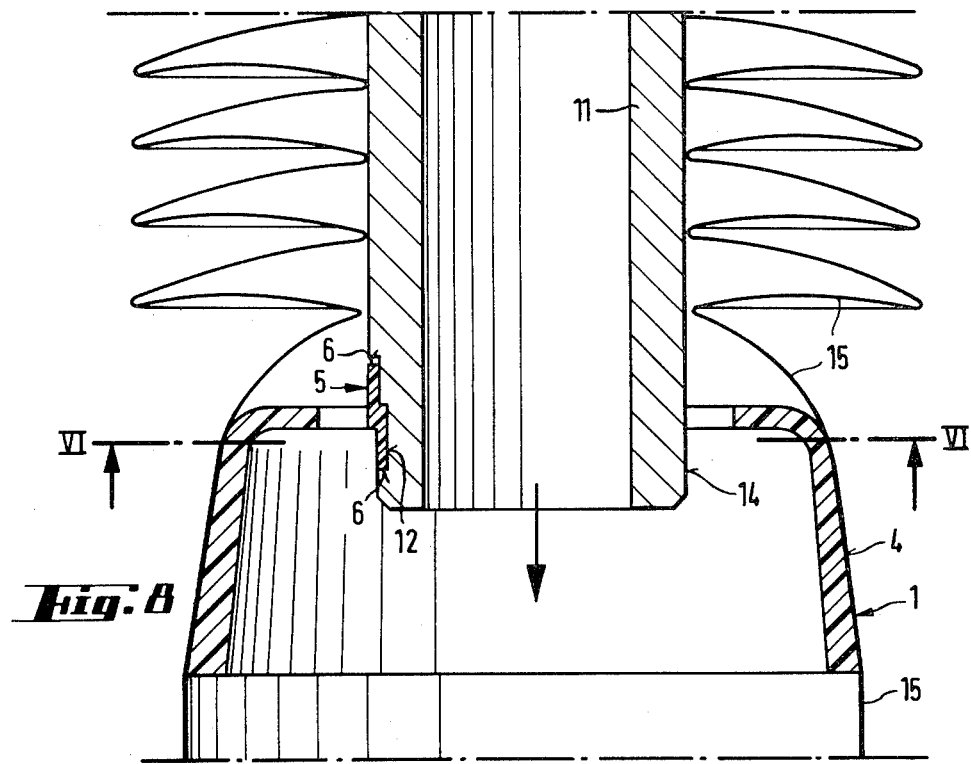

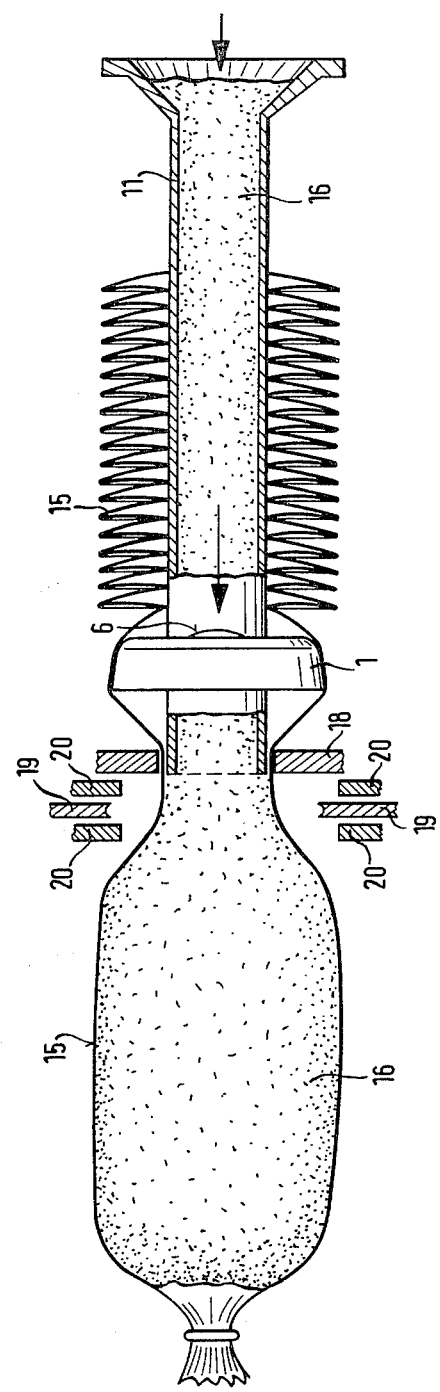

DEVICE FOR FILLING A SHIRRED TUBULAR CASING

BACKGROUND OF THE INVENTION

1. Field of the Invention

The invention relates to a device for use with stuffing machines for stuffing shirred tubular casings having a uniform diameter. It particularly relates to a device which is adapted for mounting on the stuffing horn of such machines for effecting deshirring and smoothing of the shirred tubular casing prior to stuffing.

2. The Prior Art

It is known to use shirred tubular casings of a synthetic, semi-synthetic or natural material for the packaging of food items such as, for example, meat, in the form of sausages. The shirred casings utilized for this purpose, also called "sticks" or "hollow rods" by those skilled in the art, are produced by shirring and compressing long tubes of casing in the direction of their longitudinal axis to approximately one to three percent of their original length. In order to fill the shirred casing with sausage composition or other food product, conventionally one end of the shirred casing is first closed, and then the shirred casing is normally fit onto the stufffing tube of a stuffing machine. A sausage mixture is then forced, under pressure, through the stuffing tube into the casing, by which the shirred casing is continuously deshirred. After a predetermined length of the casing has been filled, the filled sausage casing is subdivided into cylindrical sausages which are then tied off and closed.

For a number of reasons, it is desirable that the diameter of the sausages thus produced remains constant over their entire length. Optimum filling of the tubular casing requires that a uniform diameter, the size of which is dependent upon the particular casing, be maintained over the entire length of the casing. If the casing is overstuffed, it may burst, while an insufficiently filled sausage will have a wrinkled surface.

Several prior art devices have been developed for uniformly controlling the diameter of the tubular casing during filling with sausage mixtures or other food products. Thus, it is known to fit a calibrating means to the opening of the stuffing horn, which prestretches the casing to be filled by pressing against the inside wall thereof. The contact pressure creates frictional forces between the calibrating device and the inner wall of the casing, which acts to slow down withdrawal of the casing from the stuffing horn (U.S. Pat. No. 3,457,588). Suitable calibrating means which have heretofore been used in the prior art comprise, for example, resilient fingers disposed at the rim of the stuffing horn opening, which are produced by forming slits therein (U.S. Pat. No. 3,264,679). These fingers press against the internal wall of the casing and thus enlarge it. By drawing the casing over these fingers during the stuffing process, a frictional resistance is created which controls the draw-off speed of the casing from the stuffing horn. This device has the disadvantage, however, that the frictional resistance is very high during the stuffing process, and the casing may thus tear. Furthermore, there is the danger of damage to the casing by the spread fingers. Moreover, the device does not represent an independent functional unit comprising a calibrating member and a tubular casing.

It has also been proposed to prepackage the shirred tubular casing together with a calibrating disk and to attach this combination to the stuffing horn prior to the filling operation (U.S. Pat. No. 4,007,761). The calibrating disk is disposed within an unshirred section of the casing and has an external circumference which must be larger than the internal circumference of the unshirred casing. During filling, the casing is drawn over the calibrating disk and is thereby stretched. The calibrating disk must therefore be made of a rigid, inelastic material in order to prevent its diameter from being altered by the pressure of the casing against the circumference of the calibrating disk.

This inelastic calibrating disk therefore has the disadvantage that in the case of fluctuations in the circumference of the casing—which cannot be entirely avoided during manufacture—an optimum filling of the casing is not achieved. When the internal diameter of the casing is too small, there is also the danger that it will be damaged or torn by the calibrating disk. At the very least, an undesirably high friction will occur between the casing and the calibrating disk, leading to overstuffing of the casing with sausage mixture and the inability to withstand the high pressures formed during boiling of the sausage.

A calibrating device is further known (U.S. Pat. No. 4,202,075) which is made of a flexible material and which has a variable diameter. This device is also intended to stretch and expand the tubular casing prior to its being filled with a sausage composition, while the device provides a controllable degree of expansion. Even with this device, however, strong frictional forces between the tubular casing and the calibrating device can occur.

Other prior art casing calibrating devices and stuffing arrangements are shown, for example, in U.S. Pat. Nos. 4,077,090, 4,017,941, and 4,034,441. Each of these arrangements employs a sizing disk having an external diameter somewhat larger than the internal diameter of the deshirred casing.

SUMMARY OF THE INVENTION

It is an object of the present invention to provide a device suitable for deshirring and smoothing a shirred tubular casing prior to its entry into a brake part of a stuffing installation, wherein the tubular casing is converted from its shirred state to a satisfactory creaseless condition without exposing the tubular casing to the danger of being damaged. The device of the present invention is intended to make possible the drawing of the tubular casing into the brake part of the stuffing installation in a defined manner, free of jerking movements, thereby reducing the danger that the tubular casing might be torn.

In contrast to the prior art calibrating disks which have an external diameter larger than the internal diameter of the tubular casing, the present invention provides an annular hollow body having a maximum external diameter which is smaller than the internal diameter of the deshirred tubular casing; this relationship had not been predictable because it has heretofore been the generally-accepted opinion of those skilled in the art that the spreading and expansion of the tubular casing is necessary. Contrary to the prior belief that spreading and expansion of the tubular casing is always necessary, it has now been found not only that expansion is not required for the satisfactory stuffing of the tubular casing, but that it is actually a disadvantage. It is entirely adequate to draw the tubular casing, for the purpose of deshirring and smoothing, over the external surface of the annular hollow body, without expanding the tubular casing beyond its original diameter. The maximum diameter of the annular hollow body is 70 percent to 99 percent, preferably 90 percent to 99 percent, of the internal diameter of the unshirred tubular casing.

The tubular casing consists, for example, of material customarily used in the production of sausages, such as cellulose hydrate, collagen or synthetic intestines and maybe fiber reinforced. The casing has the usual coatings on its inner and/or outer surfaces, e.g., of a material impermeable to water vapor and oxygen. When a cellulose hydrate casing is used, it may have the usual water content of, for example, 6 to 10 percent, but also may have a very high water content of, for example, up to approximately 35 percent, so that there is no need to soak it in water prior to stuffing.

The essential portion of the device according to the invention is the annular hollow body which acts to deshirr and smooth the tubular casing prior to its stuffing with the sausage mixture. It consists of a circular ring with a central orifice for the application and fixation on the stuffing tube of a stuffing device, such as is customarily used for the stuffing of sausage mixtures into tubular casings. The hollow body is mounted on the stuffing tube, for example, by means of threads or a bayonet lock, preferably by means of a spring lock arrangement in the form of at least two resilient webs or a seeger ring (an expandable securing ring) adjacent to the central orifice of the hollow body, which engage a grooved recess in the outer surface of the stuffing tube. The hollow body is relatively inelastic and rigid and preferably consists of a metal or a synthetic material such as polypropylene or polyethylene. When a synthetic material with a modulus of elasticity of $10^3$–$10^4$ N/mm$^2$ is used, a thickness of, for example, two to six millimeters is adequate to obtain a sufficiently rigid hollow body. The elastic spring webs then must be of a relatively small thickness of approximately two to three millimeters.

The external surface of the annular hollow body preferably has the shape of a conically expanding annular surface which expands in a direction opposite to that of the shirred casing. The tubular casing is then drawn with its deshirred part over the annular surface.

This arrangement insures that the tubular casing, prior to stuffing and during the deshirring, attains an internal diameter amounting in the deshirred state to 70 percent to 99 percent, in particular 90 percent to 99 percent, of the internal diameter of the tubular casing prior to shirring. Any expansion or spreading of the casing is thus eliminated, together with its detrimental effect on the filling process.

The leading end of the portion of the tubular casing deshirred by passage over the hollow body is drawn through an annular brake prior to stuffing, the annular brake serving to narrow the diameter of the casing and exert a compression and braking force; during stuffing the casing is drawn through an installation, such as a clip device, which closes or binds the casing at periodic intervals, and then through a cutting station to form individual sausages.

Due to the pressure with which the paste-like stuffing material, such as a sausage mixture, is pressed through the filler tube into the deshirred portion of the tubular casing, the casing slides continuously over the external surface of the annular hollow body, causing the casing to be deshirred and smoothed without generating substantial frictional forces as a result of the mutual contact. A drawing velocity of 10 to 20 meters per minute is customarily used. The length of the external surface of the annular hollow body is advantageously 2 to 4 cm., so that at such a drawing velocity the maximum contact time between the external surface of the hollow body and the interior surface of the tubular casing is usually about 0.2 sec. The shirred part of the casing is held back by the annular hollow body. This insures additionally that only deshirred and smoothed portions of the casing may enter the brake unit and thus that the danger of breaking of the casing is clearly reduced.

Following the complete filling of the casing, the calibrating part (i.e., annular hollow body) is removed from the stuffing tube and may be reused.

A shirred tubular casing with an exterior protective covering may be provided as a pre-assembled functional unit. The protective covering consists in particular of a heat-sealable thermoplastic synthetic material such as polyamide, polyvinylchloride or a polyolefin, which may have latent shrinkability actuated by heat. It forms a supporting container for the shirred casing arranged within its cavity.

In a preferred embodiment, annular disks are provided at the respective ends of the shirred tubular casing, with the protective covering extending through the central circular opening of the disks and being turned back around the external circumference of the disks in the direction of the center of the protective covering, as shown in FIG. 4 of West German Application DE-OS No. 25 10 637 corresponding U.S. Pat. No. 4,013,099. The turned-back portion of the protective covering is preferably heat-sealed to the external surface of the protective covering in contact with the tubular casing.

The protective covering is a tubular film, preferably with perforations or net-like or lattice-like structure.

In the case of protective coverings of shrinkable film, the shrinkage is effected in the area of the portion turned back around the annular disk.

The deshirred portion of the tubular casing extending over the external surface of the annular hollow body is located outside the protective cover, and one of the annular disks is directly adjacent to one end of the hollow body.

When the thus pre-assembled functional unit is to be filled, the shirred tubular casing is pushed with its open end onto the stuffing tube of the stuffing machine and the hollow body is secured to the external surface of the stuffing tube by means of the locking members provided on its internal circumference, for example, the resilient web-like elements or the Seeger ring an expandable securing ring. A paste-like mass, such as a sausage mixture, is pressed out of the stuffing tube into the tubular casing, while the tubular casing slides through the central circular opening of the annular disk and subsequently over the circumferential outer surface of the hollow body, whereby the tubular casing is deshirred and smoothed. The diameter of the central circular opening of the annular disk must be suitably large; advantageously, it is at least as large as the internal diameter of the shirred tubular casing.

BRIEF DESCRIPTION OF THE DRAWINGS

The invention will now be explained with the aid of FIGS. 1 through 10, wherein:

FIG. 1 shows the annular hollow body in front elevational view;

FIG. 2 shows the hollow body in a sectional elevation view taken along line II—II in FIG. 1;

FIG. 3 shows the hollow body in a sectional side elevation view taken along line III—III of FIG. 1;

FIG. 4 shows a further embodiment of the annular hollow body, having a Seeger ring, in front elevational view;

FIG. 5 shows the hollow body of FIG. 4 in a sectional elevation view taken along line V—V of FIG. 4;

FIG. 6 shows a sectional view of the hollow body of FIG. 1, pushed onto and secured to a stuffing tube, along line VI—VI in FIG. 8;

FIG. 8 shows the arrangement of FIG. 6 in a sectional view taken along line VIII—VIII of FIG. 6;

FIG. 9 shows a stuffing arrangement employing the present invention, during the stuffing process.

DESCRIPTION OF THE PREFERRED EMBODIMENTS

Figure 3A:
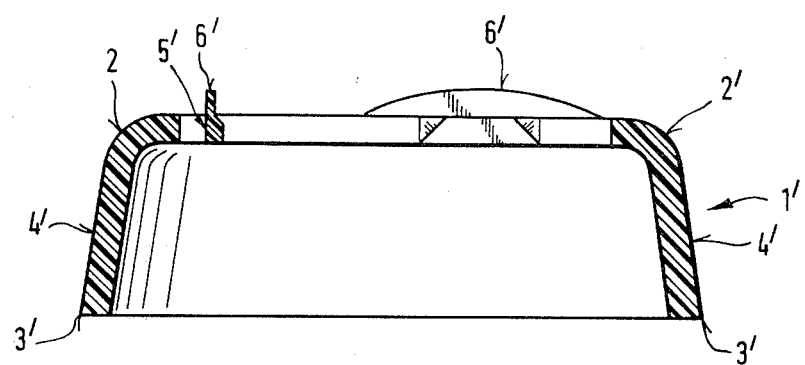
FIG. 3A shows a modified form of the hollow body of FIGS. 1-3, in a sectional side elevation view comparable to the view of FIG. 3.

As shown in FIGS. 1-3, an annular hollow body 1 has an external diameter which increases-from a first end 2 to a second end 3—to a maximum value. The annular hollow body thus has a closed external circumferential surface 4. The internal circumference of the hollow body is provided with three web-like elements 5 which have a resilient spring action and which have curved edges 6 lying in planes parallel to the longitudinal axis of the hollow body 1.

FIG. 3A shows a modified form of the hollow body of FIGS. 1-3. Viewed in front elevation, the modified hollow body of FIG. 3A appears the same as shown in FIG. 1. However, when viewed in the sectional side elevation view of FIG. 3A, it can be seen that each web-like element 5' has only a single curved edge 6'. Except for this difference, the modified hollow body 1' of FIG. 3A is identical to the hollow body 1 of FIGS. 1-3.

FIGS. 4 and 5 show a further embodiment of the annular hollow body 1, having a Seeger ring 7 an expandable securing ring rather than the web-like elements. The Seeger ring 7 is joined to two steps 8 and to the internal circumference of the hollow body 1 at a base area 9. Beveled inner edges 10 engage grooves 12 of a stuffing tube 11 (FIG. 6); recesses 17 of the Seeger ring 7 are necessary for the passage over bosses 14 of the stuffing tube 11.

Figure 7:
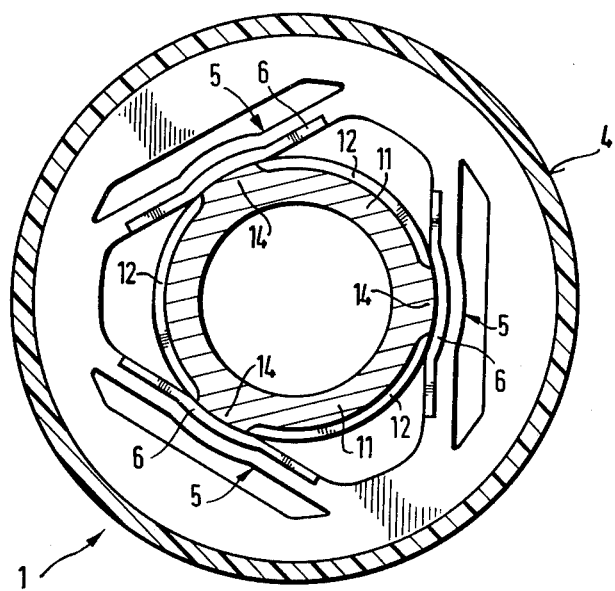
FIG. 7 shows a sectional view of the hollow body of FIG. 1 on a stuffing tube during its removal from the stuffing tube.

In FIGS. 6, 7 and 8 the annular hollow body 1 of FIG. 1 is shown pushed onto a stuffing tube 11, with each of its web-like elements 5 engaging recesses or grooves 12 in the stuffing tube 11. In order to remove hollow body 1 from the stuffing tube 11, the annular hollow body 1 is rotated in the direction of the arrow 13 (FIG. 6), whereby the web-like elements 5 are resiliently biased onto the bosses 14 of the stuffing tube 11 (FIG. 7), so that the annular hollow body 1 may be pulled off the stuffing tube 11. With hollow body 1 removed, a shirred tubular casing 15 (FIG. 8) may be mounted on the stuffing tube 11; the tubular casing slides over the external surface 4 of the remounted annular hollow body 1, whereby it is deshirred and smoothed.

FIG. 9 shows in sectional side elevation view an arrangement in which a paste-like sausage mixture 16 is forced into the tubular casing 15 from a stuffing tube 11. The casing 15 is in the shirred state on the stuffing tube 11; it slides over the annular hollow body 1 and through a brake element 18, and then passes through a schematically-represented cutting station 19 and tying station 20. Arrangements of this type are described, for example, in U.S. Pat. Nos. 4,017,941 and 4,077,090.

Figure 10:
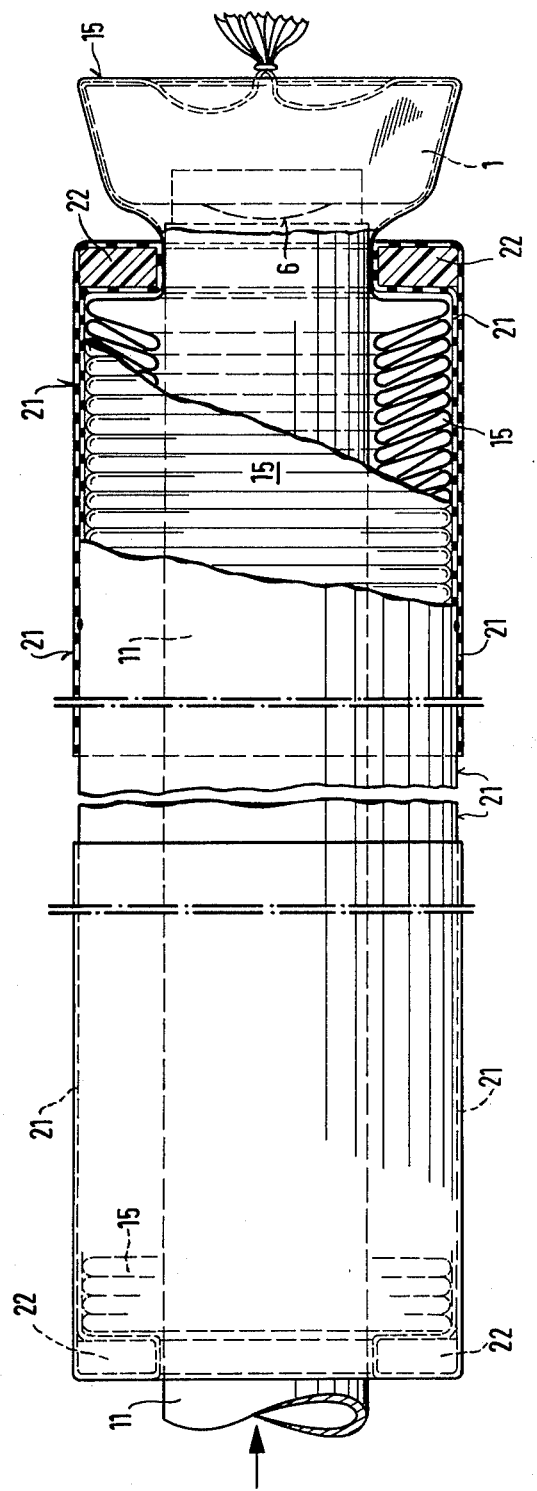
FIG. 10 shows in partially cut-away side elevation view a prepackaged functional unit having a shirred tubular casing enclosed by a covering, and having a device in accordance with the invention for deshirring and smoothing of the tubular casing as it is stuffed.

In FIG. 10, a pre-assembled functional casing unit is represented, which comprises the shirred tubular casing 15 with a deshirred end portion thereof drawn over the hollow body 1 and closed off. A protective covering 21 surrounds the shirred tubular casing 15 and passes around annular disks 22. It is turned back to the middle of the tubular casing and joined by means of heat sealing with the part of the protective covering surrounding the shirred tubular casing 15. In order to fill the pre-assembled functional unit which a paste-like mass, the functional unit is pushed with its open end (the end shown at the left portion of FIG. 10) onto the stuffing tube 11 of the stuffing machine, and the hollow body 1 is secured to the outer surface of the stuffing tube 11, as described above.

Although the hollow body of FIGS. 1-4 preferably has three of the web-like elements arranged symmetrically about the longitudinal axis of the hollow body, it will be recognized that the hollow body may have as few as two such web-like elements or may have more than three of the web-like elements. As shown in the drawings, the web-like elements preferably lie in a common plane perpendicular to the longitudinal axis of the hollow body and each web-like element is arranged along a secant of the generally circular circumferential wall of the hollow body. It will further be recognized that the spacing of brake element 18 (schematically shown in FIG. 9) from the hollow body may be variable.

While the invention has been described above in terms of certain preferred embodiments, the skilled artisan will readily appreciate that various modifications, changes, omissions and substitutions may be made without departing from the spirit of the invention. It is intended, therefore, that the present invention be limited solely by the scope of the following claims.

What is claimed is:

1. Apparatus suitable for deshirring and smoothing a shirred tubular casing as the casing is being stuffed, the tubular casing having an interior surface of predetermined internal diameter when unshirred, comprising:

a hollow body of generally annular configuration having a circumferential wall of generally circular cross-section which defines a closed external surface having a diameter which increases from a first end to a maximum at a second end of the hollow body, the hollow body having a central opening for receiving a stuffing tube and means about said central opening for releasably engaging an external surface of the stuffing tube to mount the hollow body on the stuffing tube, the hollow body being constructed of a rigid material, and the maximum diameter of said external surface being smaller than the predetermined internal diameter of the unshirred tubular casing, whereby when the hollow body is arranged within a deshirred section of the tubular casing, the tubular casing and the hollow body are mounted on the external surface of the stuffing tube, and the casing is stuffed with a mixture from the stuffing tube, the interior surface of the tubular casing slides over the generally circular external surface of the hollow body and is thereby deshirred and smoothed.

2. The apparatus of claim 1, wherein said releasable engaging means comprises at least two web-like elements symmetrically arranged about a longitudinal axis of the circumferential wall and lying in a common plane perpendicular to said longitudinal axis, each said web-like element being arranged along a secant of the generally circular wall cross-section and connected at respective ends to the circumferential wall, each said web-like element being capable of resiliently flexing outwardly of said central opening and having a portion adapted to engage a corresponding recess provided in the exterior of a stuffing tube, whereby when the hollow body is mounted on a stuffing tube having circumferential recesses, the engaging portions of the web-like elements resiliently engage the recesses, and whereby when the stuffing tube is provided with bosses at circumferential regions adjacent the recesses and the hollow body is rotated on the stuffing tube, the bosses cause the web-like elements to flex outwardly of said central opening to allow the hollow body to be withdrawn from the stuffing tube.

3. The apparatus of claim 2, wherein the web-like elements have curved protrusions extending therefrom in a direction parallel to the longitudinal axis of the hollow body.

4. The apparatus of claim 1, wherein said releasable engaging means comprises an expandable securing ring mounted within the cavity defined by said hollow body for engaging recesses provided in the exterior of the stuffing tube.

5. Apparatus for the stuffing of a shirred tubular casing with a flowable mass such as a sausage mixture flowing under pressure from the stuffing tube of a stuffing installation, comprising:

a stuffing tube;

a shirred tubular casing mounted over the stuffing tube, the tubular casing having an unshirred portion with an interior surface of predetermined internal diameter when unshirred;

a hollow body arranged within said unshirred portion of the tubular casing and secured on the stuffing tube, the hollow body having a circumferential wall of generally circular cross-section which increases in external diameter from a first end to a maximum at a second end, the hollow body having a central opening for receiving the stuffing tube and engaging means about said central opening for releasably securing the hollow body to the stuffing tube, and the hollow body being constructed of a rigid material, the maximum external diameter of the circumferential wall being smaller than the predetermined internal diameter of the unshirred tubular casing;

a brake unit mounted at a variable distance downstream of the hollow body and having an internal opening through which the unshirred portion of the tubular casing extends, the brake unit contracting the portion of the tubular casing extending therethrough;

a tying station downstream of the brake unit for applying a closure to the tubular casing after a desired length of the casing is stuffed; and a cutting station for severing the stuffed tubular casing, whereby as the tubular casing is stuffed, it slides over the generally circular wall of the hollow body in a direction from said first end to said second and is thereby deshirred and smoothed, and subsequently passes through the brake unit which contracts the deshirred casing.

6. The apparatus of claim 5, wherein said engaging means comprises at least two web-like elements symmetrically arranged about a longitudinal axis of the circumferential wall and lying in a common plane perpendicular to said longitudinal axis, each said web-like element being arranged along a secant of the generally circular wall cross-section and connected at respective ends to the circumferential wall, each said web-like element being capable of resiliently flexing outwardly of said central opening and having a portion adapted to engage a corresponding recess provided in the exterior of the stuffing tube, and said stuffing tube has an exterior surface provided with circumferential recesses and with bosses adjacent the recesses, whereby when the hollow body is mounted on the stuffing tube, the engaging portions of the web-like elements are received by the stuffing tube recesses to secure the hollow body on the stuffing tube, and when the hollow body is rotated on the stuffing tube, the bosses cause the web-like elements to flex outwardly of said central opening to allow the hollow body to be withdrawn from the stuffing tube.

7. The apparatus of claim 6, wherein the web-like elements have curved protrusions extending therefrom in a direction parallel to the longitudinal axis of the hollow body.

8. The apparatus of claim 5, wherein said engaging means comprises an expandable securing mounted within the cavity defined by said hollow body and having portions for engaging recesses provided in the exterior of the stuffing tube, the stuffing tube having recesses provided in the exterior surface thereof for receiving the engaging portions of the Seeger ring.

9. A pre-assembled functional unit for use with a stuffing installation having a stuffing tube, comprising:

a tubular casing suitable for the packaging of foodstuffs, a major portion of the tubular casing being shirred and one end portion of the tubular casing being unshirred and closed, and the tubular casing when unshirred having a predetermined internal diameter;

a device for deshirring and smoothing the tubular casing as it is stuffed, the device comprising a hollow body of generally annular configuration having a circumferential wall of generally circular cross-section which defines a central opening and a closed external surface having a diameter which increases from a first end to a maximum at a second end of the hollow body, the hollow body being arranged in the deshirred end portion of the tubular casing and having a maximum diameter at said second end which is smaller than the predetermined internal diameter of the unshirred tubular caisng; and a protective covering surrounding said shirred tubular casing, whereby said functional unit may be mounted on the stuffing tube of a stuffing installation and, as the unshirred tubular casing portion is stuffed with a mixture from the stuffing tube, the shirred tubular casing portion is drawn over the hollow body and thereby deshirred and smoothed prior to stuffing.

10. The pre-assembled functional unit of claim 9, wherein said hollow body further includes means about said central opening for releasably engaging an external surface of a stuffing tube.

11. The pre-assembled functional unit of claim 10, wherein said releasable engaging means comprises at least two web-like elements symmetrically arranged about a longitudinal axis of the circumferential wall and lying in a common plane perpendicular to said longitudinal axis, each said web-like element being arranged along a secant of the generally circular wall cross-section and connected at respective ends to the circumferential wall, each said web-like element being capable of resiliently flexing outwarldy of said central opening and having a portion adapted to engage a corresponding recess providing in the exterior of a stuffing tube, whereby when the hollow body is mounted on a stuffing tube having circumferential recesses, the engaging portions of the web-like elements resiliently engage the recesses, and whereby when the stuffing tube is provided with bosses at circumferential regions adjacent the recesses and the hollow body is rotated on the stuffing tube, the bosses cause the web-like elements to flex outwardly of said central opening to allow the hollow body to be withdrawn from the stuffing tube.

12. The pre-assembled functional unit of claim 11, wherein the web-like elements have curved protrusions extending therefrom in a direction parallel to the longitudinal axis of the hollow body.

13. The pre-assembled functional unit of claim 10, wherein said releasable engaging means comprises an expandable securing ring mounted within the cavity defined by said hollow body for engaging recesses provided in the exterior of the stuffing tube.

14. The pre-assembled functional unit of one of claims 9 to 13, wherein the protective covering surrounds only the shirred portion of the tubular casing, whereby the unshirred portion of the tubular casing is free of the protective covering.

15. The pre-assembled functional unit of claim 14, further comprising an annular disk adjacent each end of the shirred portion of the tubular casing, each annular disk having a central orifice and an external surface, wherein the protective covering extends through the central orifice of each disk and is turned back over the external surface of the disk in the direction of the center of the shirred portion of the tubular casing.

16. The pre-assembled functional unit of claim 15, wherein the protective covering is of a heatsealable material, and a turned-back portion of the protective covering is joined by heat sealing to a portion of the protective covering in contact with the shirred portion of the tubular casing.

* * * * *